United States Patent
Ohta et al.

(10) Patent No.: US 6,548,921 B2
(45) Date of Patent: Apr. 15, 2003

(54) LINEAR ACTUATOR OF SMALL SIZE

(75) Inventors: Masahiro Ohta, Saitama-ken (JP);
Toru Sukigara, Saitama-ken (JP);
Kazuhiro Kagawa, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/874,328

(22) Filed: Jun. 6, 2001

(65) Prior Publication Data
US 2001/0048250 A1 Dec. 6, 2001

(30) Foreign Application Priority Data
Jun. 6, 2000  (JP) ......................... 2000-168827

(51) Int. Cl.[7] ................. H02K 41/02; H02K 35/02
(52) U.S. Cl. ................. 310/12; 310/14; 310/13; 310/12; 318/122
(58) Field of Search ................. 310/12, 13, 14, 310/15, 23, 30, 26, 34

(56) References Cited

U.S. PATENT DOCUMENTS 3,746,937 A * 7/1973 Koike ................. 318/122
3,980,908 A * 9/1976 McClintock ................. 310/14
5,092,417 A * 3/1992 Oslapas ................. 180/79
6,274,954 B1 * 8/2001 Gander ................. 310/30

FOREIGN PATENT DOCUMENTS

JP          A8214530          8/1996

* cited by examiner

Primary Examiner—Tran Nguyen
Assistant Examiner—Iraj A Mohandesi
(74) Attorney, Agent, or Firm—Birch, Stewart, Kolasch & Birch, LLP

(57) ABSTRACT

A linear actuator includes a supporting unit with a stopper, a linear output unit, a movable unit, a magnetic flux generating unit and a control unit. The movable unit is connected to a stopper of the outer pipe at one end of the outer movable unit and to the linear output unit at the other end. The magnetic flux generating unit generates first magnetic fluxes. The movable unit has elasticity, and expands or contracts based on action of the first magnetic fluxes and the elasticity. The linear output unit linearly moves in response to the expansion or contraction of the movable unit.

19 Claims, 12 Drawing Sheets

LINEAR ACTUATOR OF SMALL SIZE

BACKGROUND OF THE INVENTION

1. Field of the Invention

The present invention relates to a linear actuator, and more particularly, to a linear actuator having a small size and a light weight.

2. Description of the Related Art

An actuator is demanded to have a good responsibility, a large output, a large displacement, a good position maintainability, a reproducibility and a good efficiency. A solid displacement type actuator using piezoelectric property, electrostriction or super magnetostriction has good responsibility and large output. However, because the solid displacement type actuator has a small displacement is made of fragile material, the solidity and stiffness are low.

Thermal shape memory alloy has a large output and a large displacement. However, the thermal shape memory alloy has a hysteresis characteristic in the displacement and the position maintainabily is low. Also, the responsibility is remarkably low and the efficiency is low.

A rotation type electromagnetic motor has a good responsibility and a large output. Also, the electromagnetic motor has a large displacement, a good position maintainability and a good solidity. Thus, the electromagnetic motor has a good efficiency. However, the electromagnetic motor has no linearity and requires an external conversion mechanism for converting a rotation operation into a linear operation. Further, the electromagnetic motor requires a deceleration mechanism. Therefore, it is difficult to miniaturize the motor.

An electromagnetic linear motor does not require such a mechanical system. However, the electromagnetic linear motor has a small output, and requires a feedback control system for position maintainability so that an application field is limited. Because electromagnetic force does not act stably to a magnetic substance body, a feedback control is necessarily required in the actuator using electromagnetic force.

An actuator using fluid pressure is complicated in an oil leakage measure and a fluid route is complicated because the actuator contains many valves.

Linear drive is needed for a joint of an arm or finger of a robot, in addition to rotation drive. A small rotary motor having a large output is generally used for the linear drive. The rotary motor is good in all physical characteristics as mentioned above. However, large size units such as the deceleration mechanism and the external conversion system need to be added in narrow spaces such as the finger and the arm, so that the rotary motor must be made to have a small size. As a result, the output of the rotary motor becomes small.

A technique is disclosed in Japanese Laid Open Patent application (JP-A-Heisei 8-214530), in which a linear motor type actuator is fabricated using a coil. In the actuator, magnetic flux convergence is improved so that a magnetic flux uniformly passes through a yoke. Thus, armature reaction effectively operates over the entire stroke. As a result, the space saving is made possible.

In the field of a finger and a joint of a robot, an electromagnetic motor is demanded to have physical and mechanical characteristics such as (1) a large output, (2) a good responsibility, (3) a large displacement and (4) a good reproducibility characteristics, (5) a good efficiency, (6) a large output, (7) a small size, and (8) a high linearity. In addition, the high degrees of freedom of the design are demanded. Both of these physical and mechanical characteristics are demanded in the industry field such as an industrial robot, a machine tool, and a car. In such an application field of the linear actuator, the small size and light weight are especially demanded without use of any displacement convert mechanism and deceleration mechanism.

SUMMARY OF THE INVENTION

An object of the present invention is to provide a linear actuator in which smallness and lightening can be more promoted by mixing and combining the physical characteristics and the mechanical characteristics.

Another object of the present invention is provide a linear actuator in which degrees of freedom of design can be made higher by mixing and combining the physical characteristics and the mechanical characteristics.

Still another object of the present invention is to provide a linear actuator in which reproducibility and responsibility can be made higher so that smallness and lightening can be more promoted by mixing and combining the physical characteristics and the mechanical characteristics.

Yet still another object of the present invention is to provide a linear actuator in which deformation expanding mechanism and operation conversion mechanism are not necessitated and smallness and lightening can be more promoted by mixing and combining the physical characteristics and the mechanical characteristics.

In an aspect of the present invention, a linear actuator includes a supporting unit with a stopper, a linear output unit, a movable unit, and a magnetic flux generating unit. The movable unit is connected to the stopper of the supporting unit at one end of the movable unit and to the linear output unit at the other end thereof. The magnetic flux generating unit generates first magnetic fluxes. The movable unit has elasticity, and expands or contracts based on action of said first magnetic fluxes and the elasticity. The linear output unit linearly moves in response to the expansion or contraction of the movable unit.

The movable unit desirably includes a spring coil.

Also, the magnetic flux generating unit may generate the first magnetic fluxes in a direction orthogonal to a direction of the second magnetic fluxes.

Also, at least a part of the magnetic flux generating unit is accommodated in the movable unit. In this case, the magnetic flux generating unit may include a bobbin case, and an electromagnetic coil which is wound on the bobbin case.

In this case, a control unit is further provided to supply current to the magnetic flux generating unit such that the magnetic flux generating unit generates the first magnetic fluxes.

When the movable unit is composed of a spring coil, the control unit may supplies a second current to said spring coil such that the spring coil generates second magnetic fluxes. The spring coil expands or contracts such that interaction between said first magnetic fluxes and said second magnetic fluxes balances with elasticity of said spring coil. In this case, the control unit may supply constant current to the movable unit and control the current supplied to the electromagnetic coil to control the expansion and contraction of the movable unit. Alternatively, the control unit may supply constant current to the magnetic flux generating unit and control the current supplied to the movable unit to control the expansion and contraction of the movable unit.

Also, the magnetic flux generating unit may include a bobbin case and magnets which are embedded in the bobbin case. When the movable unit is composed of a spring coil, a control unit is further provided to supply a second current to said spring coil such that said spring coil generates second magnetic fluxes. The spring coil expands or contracts such that interaction between said first magnetic fluxes and said second magnetic fluxes balances with elasticity of said spring coil. In this case, the control unit may control the current supplied to the movable unit to control the expansion and contraction of the movable unit.

Also, the supporting unit may include a first pipe and the stopper which is attached to one end of the first pipe. A part of the linear output unit is slidably accommodated in the first pipe. In this case, the linear output unit may include a second pipe provided to be slidable with the first pipe, and a stopper which is attached to one end of the second pipe opposing to the first pipe and to which the movable unit is connected.

Also, the supporting unit may include a first pipe, the stopper which is attached to one end of the first pipe, and an additional stopper which is attached to the other end of the first pipe and has a hole section. A part of the linear output unit is slidably accommodated in the first pipe. In this case, the linear output unit may include a base section which is accommodated in the first pipe and to which the movable unit is connected, and the moving section which extends from the base section through the hole section of the additional stopper.

Also, the stopper of the supporting unit and the magnetic flux generating unit may be made unitary.

In another aspect of the present invention, a linear actuator includes a magnetic flux generating section and a movable section. The magnetic flux generating section is fixed and generates first magnetic fluxes in a first direction. The movable section includes a spring coil, is attached to the magnetic flux generating section, accommodates at least a part of the magnetic flux generating section and generates second magnetic fluxes in a second direction orthogonal to the first direction. The movable section linearly expands or contracts such that interaction between the first magnetic fluxes and the second magnetic fluxes balances with the elasticity.

Here, the movable unit may include a spring coil. Also, the magnetic flux generating section may include a bobbin case and an electromagnetic coil which is wound on the bobbin case to generate the first magnetic fluxes.

Also, the movable unit may include a spring coil. Also, the magnetic flux generating section may include a bobbin case and magnets which are embedded in the bobbin case to generate the first magnetic fluxes.

Also, the magnetic flux generating section may include a first pipe and a stopper which is attached to one end of the first pipe. A part of the movable section is provided to be slidable with the magnetic flux generating section.

In still another aspect of the present invention, a linear actuator includes a mechanical operation body, a magnetic flux generating unit and a linear output body. The mechanical operation body expands or contracts in response to magnetic force. The magnetic flux generating unit generates magnetic fluxes in a direction orthogonal to a direction of expansion or contraction of the mechanical operation body. The linear output body outputs contraction power of both ends of the mechanical operation body and moves relatively to in the direction of the expansion or contraction of the mechanical operation body. The mechanical operation body has a spring constant and expands or contracts to a length corresponding to the magnetic flux generated by the magnetic flux generating unit.

DESCRIPTION OF THE PREFERRED EMBODIMENTS

Hereinafter, a linear actuator of the present invention will be described below in detail with reference to the attached drawings.

Figure 1:
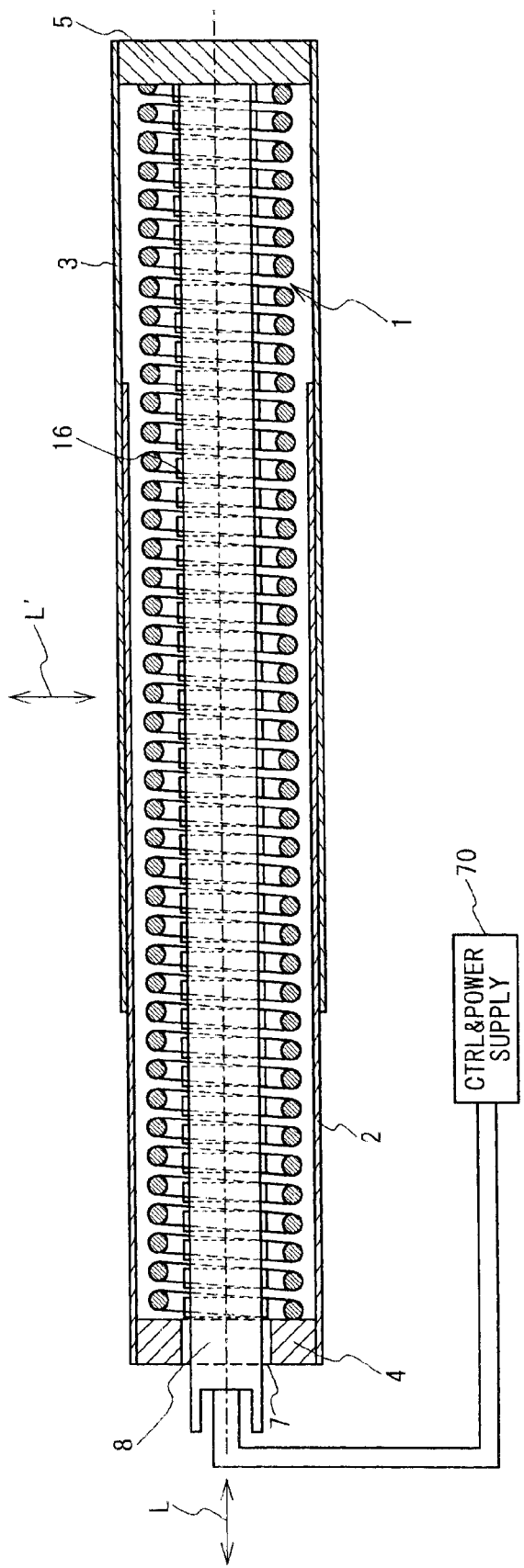
FIG. 1 is a front cross sectional view showing the structure of a linear actuator according to a first embodiment of the present invention.

FIG. 1 is a front cross sectional view showing the structure of a linear actuator according to the first embodiment of the present invention. Referring to FIG. 1, the linear actuator in the first embodiment is composed of a movable unit 1, cylinder housings 2 and 3, stoppers 4 and 5, a magnetic flux generating unit 8, and a control and power supply 70. In the linear actuator in the first embodiment, an electromagnetic coil 8 as the magnetic flux generating unit is inserted in a spring coil 1 as the movable unit.

The spring coil 1 is formed of soft magnetic metal and continuously wound in a spiral form, as shown in FIG. 1. The spring coil 1 may be wound on a circular cylinder (pipe) or a polygonal cylinder. Also, such a cylinder may be not used. The spring coil 1 smoothly expands and contracts along an axis L. At this time, the shape of the spring coil 1 has well reproducibility in accordance with Hooke's law. In this way, such a spring coil 1 has most excellent physical and mechanical characteristics.

It should be noted that the material of the spring coil 1 desirably has spring property and high magnetic permeability with small hysteresis. Therefore, the spring coil 1 is formed of material such as Fe, Ni, other metal, and various nonmetal alloys. Stainless steel (SUS) is more suitable as the material.

The spring coil 1 is accommodated in a first housing 2 and a second housing 3. Both of the first housing 2 and the second housing 3 are circular cylinders or pipes. The first housing 2 is arranged inside the second housing 3, and is guided by the inner cylindrical surface of the second housing 3 such that the first housing 2 can slide and move along the axis L reciprocally. The material of the first housing 2 and the material of the second housing 3 may be magnetic material or non-magnetic material. A first stopper 4 is firmly attached into an opening end of the first housing 2. The second stopper 5 is firmly attached into an opening end of the second housing 3. One end of the spring coil 1 is firmly supported by the first stopper 4, and the other end of the spring coil 1 is firmly supported to the second stopper 5. Thus, when the spring coil 1 contracts and expands along the axis L, the circular cylinder 2 as a linear output unit can move reciprocally.

Figure 2:
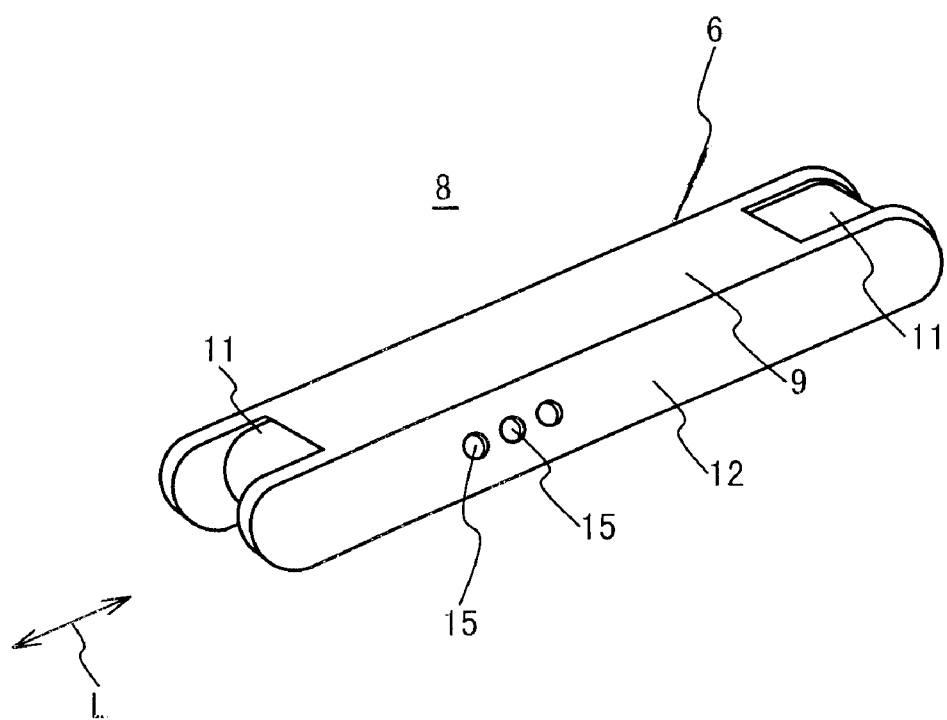
FIG. 2 is a perspective view showing a bobbin case for an internal magnetic flux generating unit inserted in the linear actuator according to a first embodiment of the present invention.

As shown in FIG. 2, the electromagnetic coil 8 is composed of a long bobbin case 6 and a coil 14. A central hole 7 is formed along the axis L to pass through the first stopper 4. The bobbin case 6 is inserted coaxially into the first housing 2 and the second housing 3 through the central hole 7, and also coaxially in the spring coil 1. The bobbin case 6 is formed of resin (non-magnetic substance body) of polygonal column. One end of the bobbin case 6 is firmly attached to the second stopper 5. The other end of the bobbin case 6 is free from the first stopper 4. The bobbin case 6 has hollow portions so that it is lightened. The bobbin case 6 has a main portion 9 and coil end portions 11 at the both ends. The main portion 9 is formed to have the shape of a quadrangular column 12. Each of coil end portions 11 is formed to have the shape of a semi-circular column 11.

Figure 3:
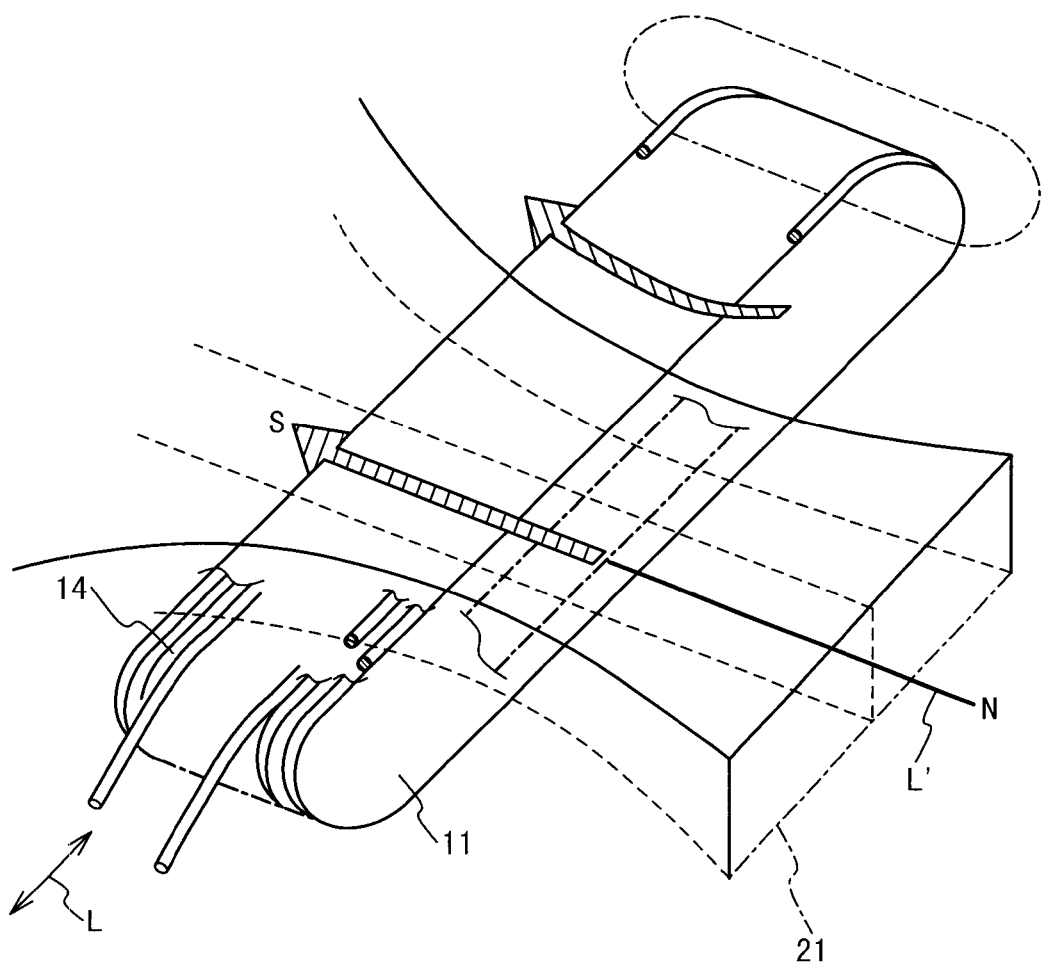
FIG. 3 is a perspective view showing the state of magnetic fluxes generated by the magnetic flux generating unit.

The coil 14 is provided on the main portion 9 of the bobbin case 6 by winding an electrically conductive wire on the main portion 9 to extend along the axis L, to be turned back and to extend along the axis L again, as shown in FIG. 3. The electrically conductive wire of the coil 14 extends smoothly along the surface of the semi-circular column 11. Copper is suitable as the material of the coil 14 in material cost. The direction L' of the center axis of the coil 14 is orthogonal to the axis L, as shown in FIG. 3.

Iron core holding holes 15 are formed to pass through the bobbin case 6 along the direction L' of the center axis in the side walls. As shown in FIG. 1, when the number of turns in the spring coil 1 is 40, it is desirable that the number of iron core holding holes 15 is less than 40. More specifically, it is desirable that the pitch between the iron core holding holes 15 is ½ of the pitch of the spring coil 1. An iron core 16 is inserted in each of the iron core holding holes 15. The iron core 16 is firmly attached to the bobbin case 6. The center axis of the iron core 16 is parallel to the direction L' of the central axis.

The control unit & power supply 70 supplies current to the electromagnetic coil 14 as the magnetic flux generating unit such that the electromagnetic coil 14 generates the first magnetic fluxes. In this case, the control unit 70 controls the current supplied to the electromagnetic coil 14 to control the expansion and contraction of the spring coil 1. In this way, the first magnetic fluxes generated by the electromagnetic coil 14 are orthogonal to an extending direction of the spring coil 1 as the movable unit.

Figure 4:
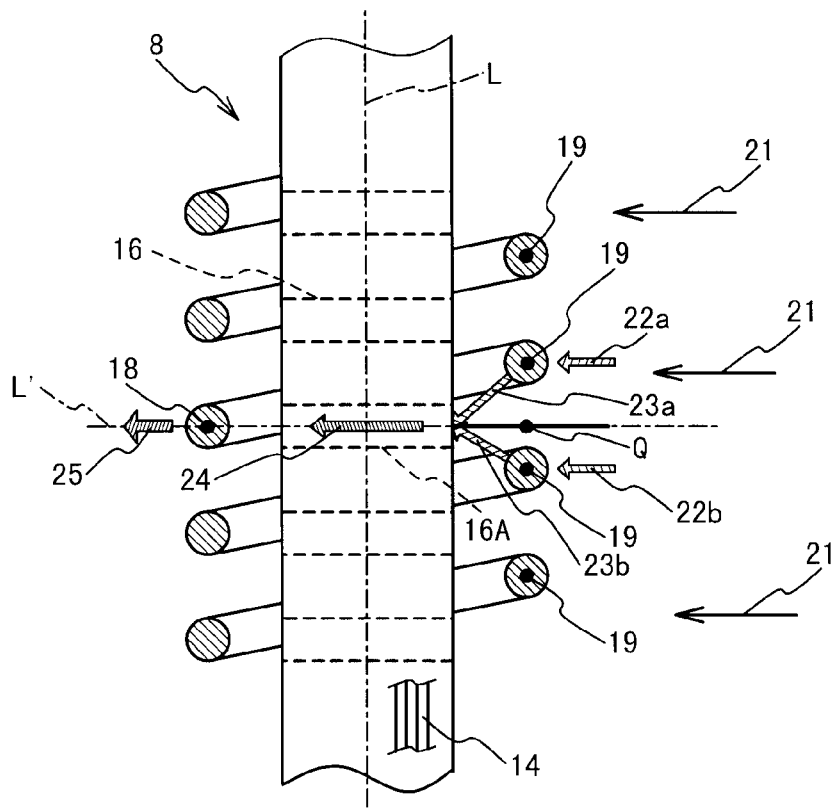
FIG. 4 is a front cross sectional view showing the operation of the magnetic flux generated by the magnetic flux generating unit.

FIG. 4 shows relation in phase between the spring coil 1 and the iron core 16. Although there is theoretically no technical meaning that relation of both must be particular, FIG. 4 shows the phase relation to make a magnetic force generation mechanism clear. A point is present in a cross sectional plane shown in FIG. 4, and is an intersection between the axis L and the axis L'. The point is set as an origin. In a polar coordinate system, a central point 18 of the spring coil 1 in the cross sectional plane is on the 180-degree position and a central point 19 in the other cross sectional plane is on the 0-degree position. A line in a radius direction passing through the center point is coincident with the center line of the iron core 16 and passes the midpoint between the central points 19 and 19 or the neighborhood point Q.

When current flows through the electromagnetic coil 14, a magnetic path 21 of the approximately rectangular shape is formed. The magnetic path is flat and the direction of the magnetic path is substantially parallel to the axis L' in the iron core 16. A magnetic flux 22a at a part of the magnetic path 21 parallel to the axis L' is bent at one central point 19, and connected to an oblique magnetic flux 23a which directs to one end of a specific iron core 16A. The oblique magnetic flux 23a invades into the specific iron core 16A and connected to the magnetic flux 24 in the iron core 16A which is parallel to the axis L'. The magnetic flux 24 in the iron core 16A is connected to a return magnetic flux which passes through the other central point 18 in parallel to the axis L'. The magnetic flux 22b as another part of the magnetic path 21 parallel to the axis L' is bent at the other central point 19, and is connected to oblique magnetic flux 23b which directs to one end surface of the specific iron core 16A. The oblique magnetic flux 23b invades in the iron core 16A and connected to the magnetic flux 24 which is parallel to the axis L'. The magnetic flux 24 in the iron core 16A is connected to the return magnetic flux which passes through the other central point 18 in parallel to the axis L'.

If the bobbin case 6 is a fixed stationary system, the iron core 16 fixed in the bobbin case 6 is a stationary system. A component of the oblique magnetic flux 23a in a direction of the axis L and a component of the oblique magnetic flux 23b in a direction of the axis L are opposite to each other and the adjacent central points 19 receive magnetic force to attract each other as a result of the generation of second magnetic fluxes in spring coil 1. All the central points 19, 19, . . . , 19 are not immovable points to a stationary system and are movable points. All the central points 19, 19, . . . , in the entire system attract each other and the spring coil 1 contracts. The first housing 2 and the second housing 3 relatively approach to each other by the contraction length in correspondence to the contraction. Through the contraction, the central points 19 moves toward the second stopper 5 of the second housing 3 so that the phase to iron core 16 in the axis L changes. The phase changes are largely at the central points 18 and 19 nearer to the first stopper 4 of the first housing 2.

Two adjacent central points 19 receive attractive force by two oblique diagonal magnetic fluxes whatever values those phases have. A previously mentioned dynamic analysis is carried out only about the magnetic force acting on the central point. However, as shown in FIG. 4, the magnetic force acts on the other points whose phases are shifted from those of the central points 18 and 19 by 90 degrees to an angle coordinate direction. Moreover, the magnetic inclination always exists in an optional portion of the spring coil 1 which is not fully contained in the plane parallel to the axis L' and inclines with respect to the axis L'. Therefore, the optional portion of the magnetic coil 1 receives the magnetic force such that the center line is coincident with the direction of the magnetic path. Therefore, the spring coil 1 continues to always receive the magnetic force in the contraction direction regardless of the relative phase of the iron core 16. Because the spring coil 1 receives the magnetic force in the contraction direction without relation with the phase, all the iron cores 16 can be substituted for a solid iron core of the circular column or quadrangular column. The bobbin case 6 itself may be substituted for the iron core. The reason why the bobbin case 6 is made of resin as non-magnetic material, and many iron cores 16 used in the bobbin case 6 is for the overall lightening.

The mechanical movable unit is not limited to the spring coil, and a spring structure such as plate spring of a bending type is widely applied in accordance with an application object of the linear actuator. Because the spring coil is an operation body, the displacement amplifier mechanism is unnecessary theoretically. Because there is not the displacement amplifier mechanism, the linear actuator is excellent in durability and reliability. The spring coil may be formed of soft magnetism material and has high contraction efficiency. The iron core improves the convergence of the magnetic flux so that the magnetic flux passes through the spring coil efficiently. Therefore, the contraction efficiency of the spring is high. The spring coil may be arranged around the magnetic field generation source. Therefore, the operation efficiency and the energy conversion efficiency are high. In many cases, the soft magnetic material is material suitable for the spring (Fe system, and SUS system) so that the degrees of freedom of design are expanded.

Next, the linear actuator according to the second embodiment of the present invention will be described below.

Figure 5:
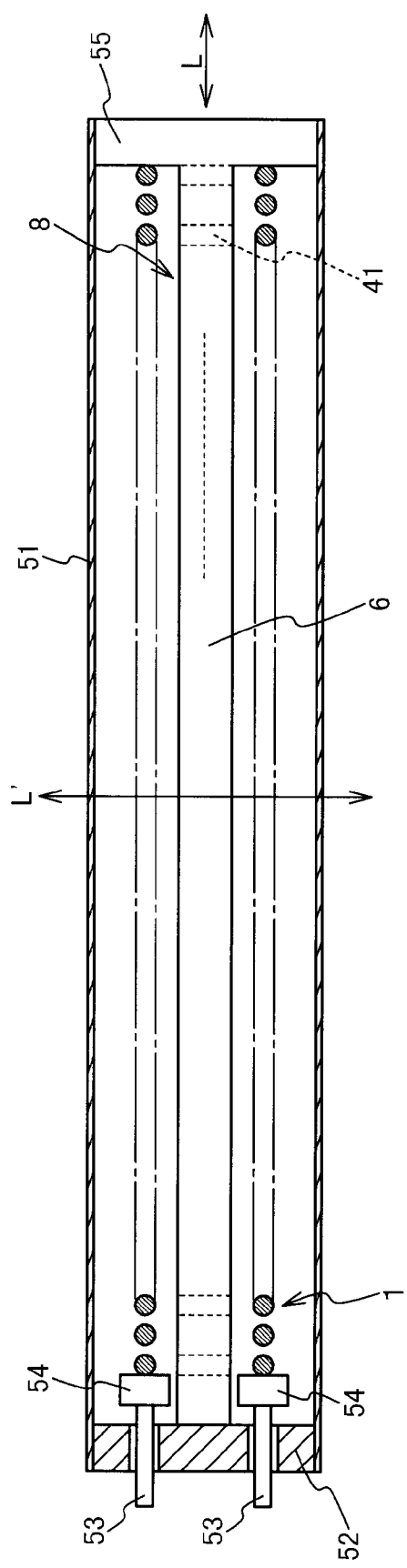
FIG. 5 is a cross sectional view showing the linear actuator according to a second embodiment of the present invention.

FIG. 5 shows the linear actuator according to the second embodiment of the present invention. Referring to FIG. 5, two operation pins 53 as the linear output unit penetrate a stopper 52 of a unitary cylinder 51. A brim 54 is provided for the operation pin 53. The brims 54 are arranged in the cylinder 51. The one end of the spring coil 1 is supported and fixed by the other lid 55 of the cylinder 51 in the direction of the axis L. The other end of the spring coil 1 is attached to the brims 54. The lid 55 is connected to the magnetic flux generating unit 8 as a unit. The magnetic flux generating unit 8 has many holes extending to a direction orthogonal to the direction L. Permanent magnets 41 are inserted in the holes. Therefore, in the second embodiment, it is not necessary to flow current through the coil 14, so that the control and power supply 70 is omitted.

Figure 6:
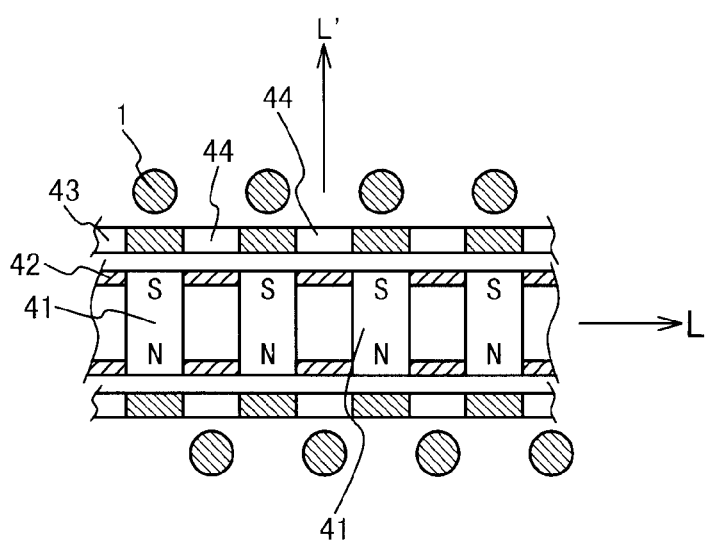
FIG. 6 is a cross sectional view showing a magnetic flux generating unit in the linear actuator according to the second embodiment of the present invention.

FIG. 6 shows a magnetic flux generating unit 8 used in place of the electromagnetic coil. In this case, the magnetic fluxes are generated by the permanent magnet 41. Many bar magnets 41 are arranged in a magnet support pipe 42 so that the magnetic fluxes from the magnets 41 turn to the direction of the central axis L'. A magnetic flux shielding unit or a magnetic flux changing unit 43 is interposed between the spring coil 1 and the bar magnets 41. The magnetic flux changing unit 43 is formed of soft magnetic material and many holes 44 are formed in the same pitch as an array pitch of the bar magnets 41. The holes 44 moves relatively to the magnet support pipe 42 along the axis L so that the magnetic flux changing unit 43 functions to shield the magnetic force of the bar magnet 41 to the spring coil 1, or to change the effective magnetic path of the magnetic fluxes of the bar magnets 41. As a result, the change of the magnetic flux inclination is caused to contract or expand the spring coil 1. The large expansion and contraction force of the spring coil 1 is amplified by the small force to drive the magnetic flux changing unit 43, or the displacement distance is amplified. The linear actuator in the second embodiment has an amplification operation and a position control of the magnetic flux changing unit 43 is easy. Therefore, the expansion and contraction length of the spring coil 1 can be effectively controlled.

The contracting and expanding operations of the spring coil 1 are as mentioned above and the operation pins 53 move with respect to the pipe 51 in response to the expansion and contraction of the spring coil 1. This embodiment can provide a sharp actuator because the friction slide area is small and the mass of the linear output body is small, unlike the above embodiment.

Figure 7:
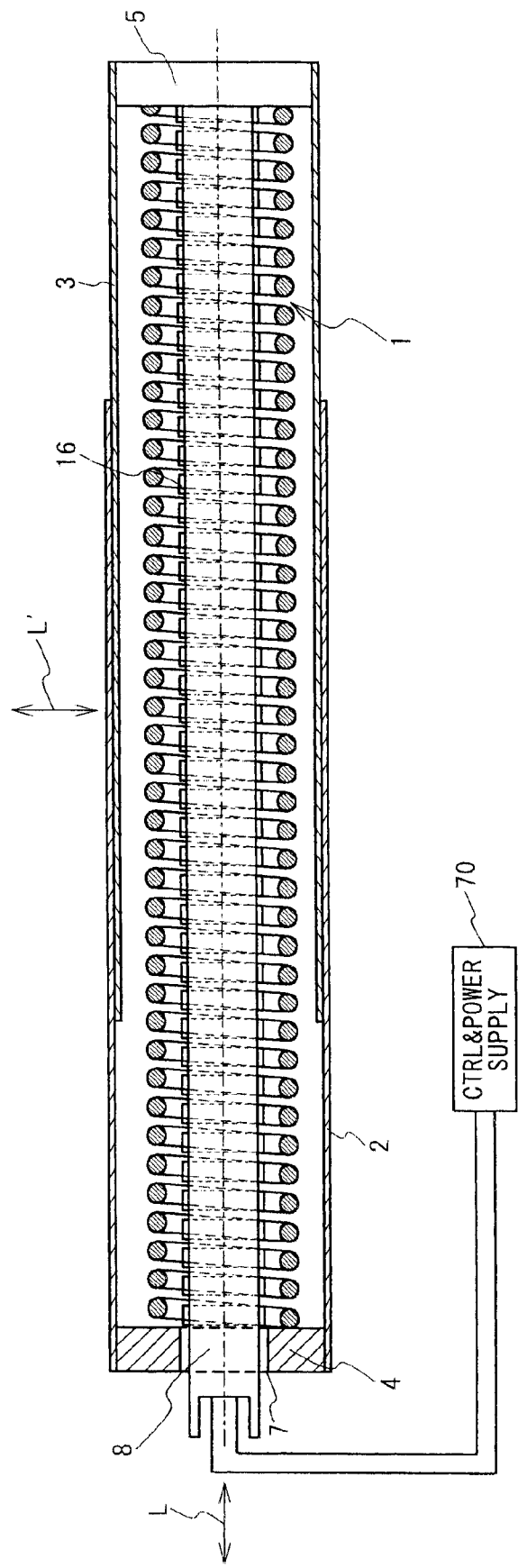
FIG. 7 is a cross sectional view showing the linear actuator according to a modification of the first embodiment of the present invention.
Figure 8:
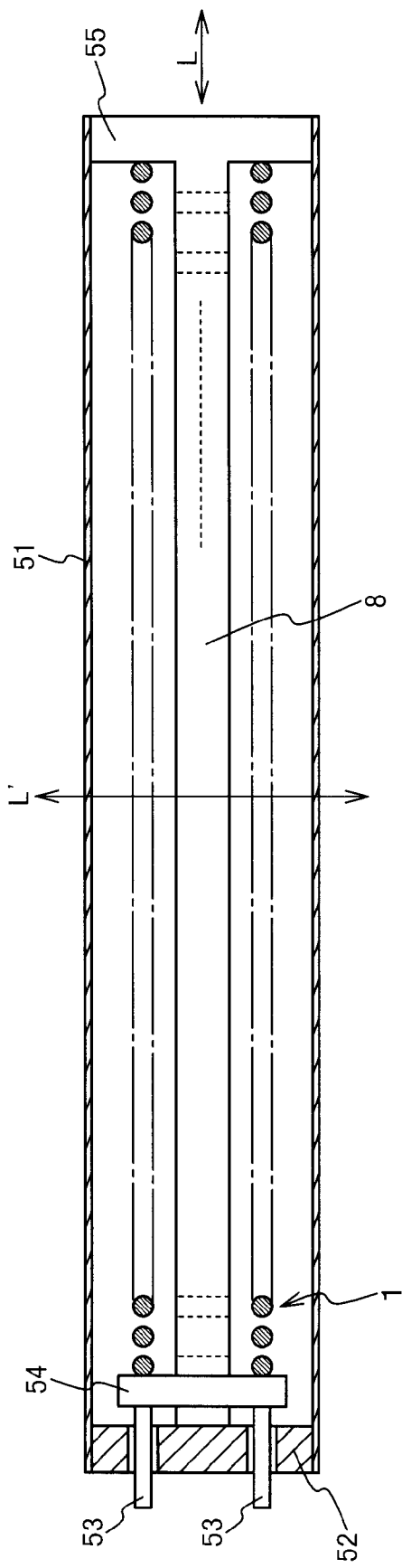
FIG. 8 is a cross sectional view showing the linear actuator according to a modification of the second embodiment of the present invention.
Figure 9:
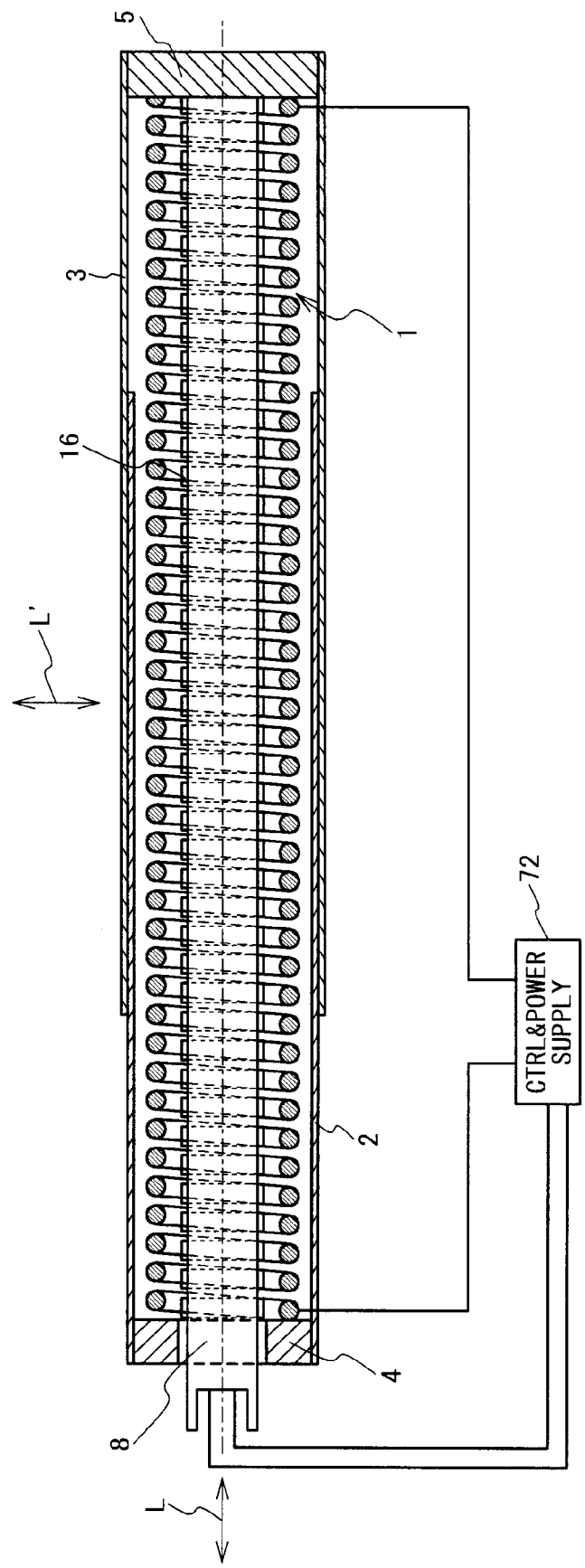
FIG. 9 is a front cross sectional view showing the structure of the linear actuator according to a third embodiment of the present invention.

FIG. 7 and FIG. 8 are modifications of the linear actuator in the first and second embodiments. In FIG. 7, the circular cylinder 2 is provided on the outer side of the circular cylinder 3. Also, in FIG. 8, the pins 53 are connected to a single brim 54. The structures and operations will be obvious to the person in the art from the above first and second embodiments. Therefore, the detailed description is omitted.

Next, the linear actuator according to the third embodiment of the present invention will be described. The third embodiment is similar to the first embodiment in the structure. Therefore, only the different point will be described.

Figure 10:
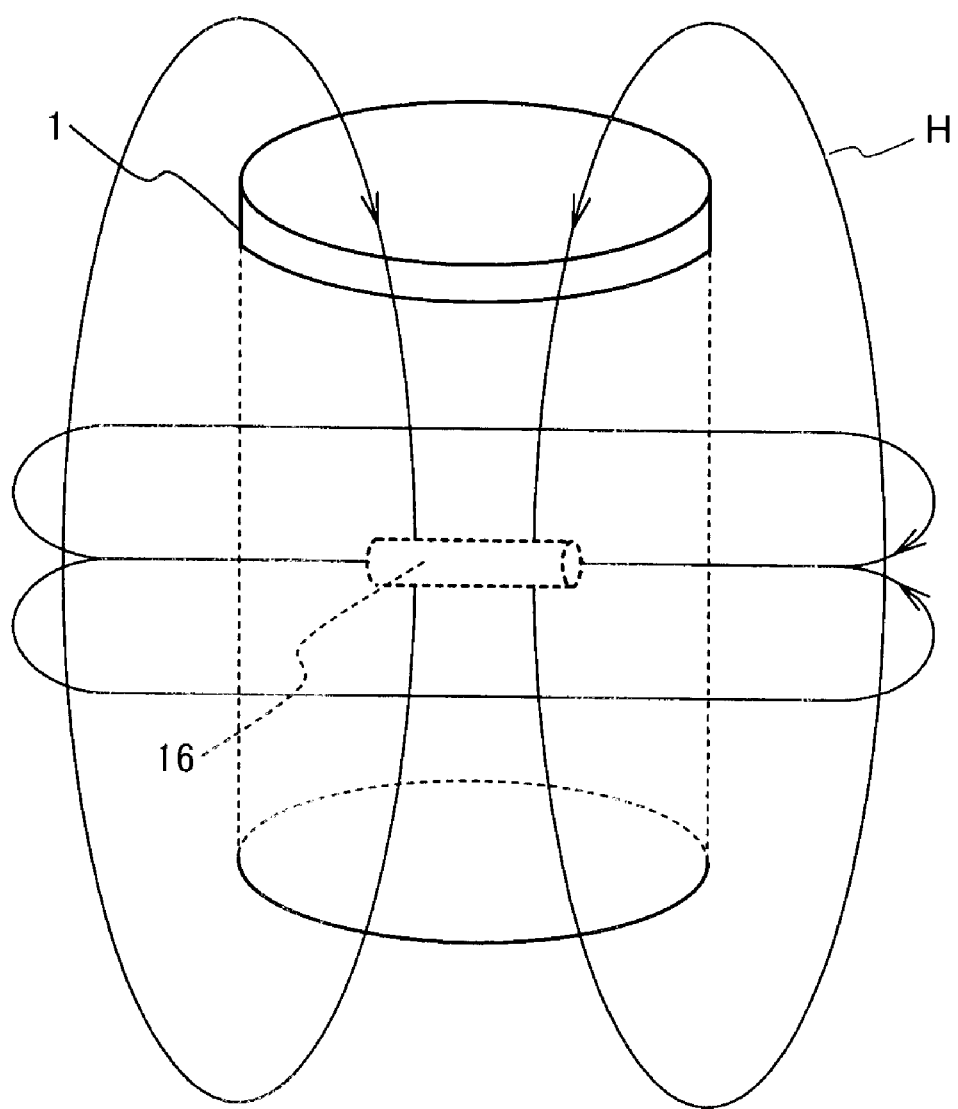
FIG. 10 is a diagram showing the magnetic fluxes generated by the magnetic flux generating unit and the magnetic fluxes generated by a movable unit.

In the third embodiment, a control unit & power supply 72 supplies current to the electromagnetic coil 14 as the magnetic flux generating unit such that the electromagnetic coil 14 generates the first magnetic fluxes. The control unit 72 supplies current to the spring coil 1 as the movable unit 1 to generate the second magnetic fluxes. When a constant current is supplied to the spring coil 1, the control unit 72 controls the current supplied to the electromagnetic coil 14 to control the expansion and contraction of the spring coil 1. Alternatively, the control unit 72 may supply constant current to the electromagnetic coil 14. In this case, the control unit 72 controls the current supplied to the spring coil 1 to control the expansion and contraction of the spring coil 1. In this way, the first magnetic fluxes generated by the electromagnetic coil 14 are orthogonal to the second magnetic fluxes H generated by the spring coil 1, as shown in FIG. 10.

The first housing 2 or the second housing 3 functions as the operation portion of the actuator. When the first current supplied to the electromagnetic coil 14 is changed, the second magnetic fluxes intend to change through the interaction of the first and second magnetic fluxes because of conservation of magnetic field. Thus, the spring coil 1 expands or contracts by a displacement L. When the second current supplied to the spring coil 1 is expressed by I, the second magnetic fluxes H by the spring coil 1 is approximately proportional to the second current I and approximately inversely proportional to a summation of the displacement L and the length of the spring coil 1. However, when the spring coil 1 is longer than the displacement, the change of the second magnetic fluxes can be considered to be approximately linear in a range corresponding to the displacement L. Thus, thrust force larger than the known linear motor is generated. On the other hand, the spring coil 1 has a spring constant or elastic coefficient k, and elastic restoration force kL due to the displacement L acts. In this way, the spring coil 1 stops on the position where the expansion or contraction force of the spring coil 1 due to the interaction of the first and second magnetic fluxes balances with the elastic force of the spring coil 1. Through the expansion or contraction of the spring coil 1, the first housing 2 as a linear output unit slides and moves with respective to the second housing 3.

Because the displacement L is absolutely determined based on the absolute value of the current, this actuator does not need any feedback control theoretically, and any position detection mechanism for the feedback is unnecessary. Through the control of the current value, the relative position control of the first housing 2 and the spring coil 1 is possible. Because the drive system is not a rotation system, a mechanical conversion mechanism for converting a rotation operation into a linear operation is unnecessary. The previously mentioned 8 conditions are all satisfied.

Figure 11:
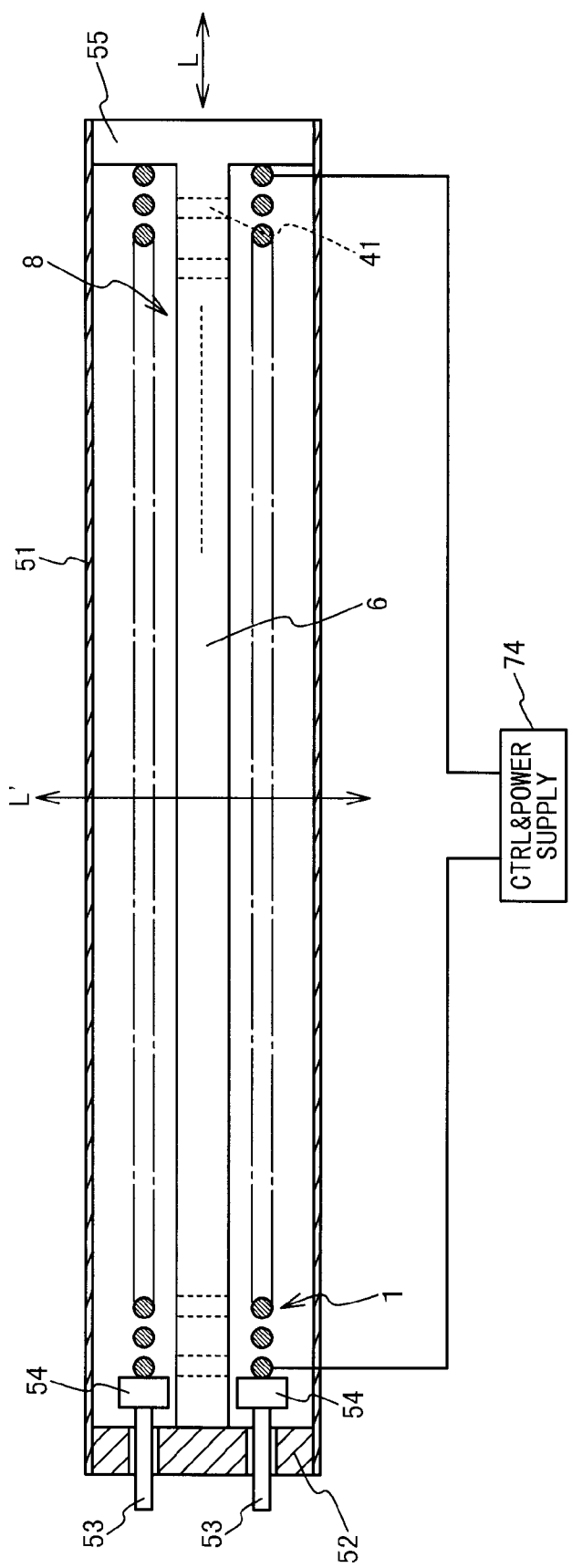
FIG. 11 is a cross sectional view showing the linear actuator according to a fourth embodiment of the present invention.

FIG. 11 shows the linear actuator according to the fourth embodiment of the present invention. The linear actuator in the fourth embodiment has the same magnetic flux generating unit as shown in FIG. 6 in the second embodiment. When the magnetic flux changing unit 43 is adjusted or the current supplied to the spring coil 1 is changed, the actuator contracts or expands. The other structure is same as the second embodiment. The operation of the actuator will be clear from the second and third embodiment.

Figure 12:
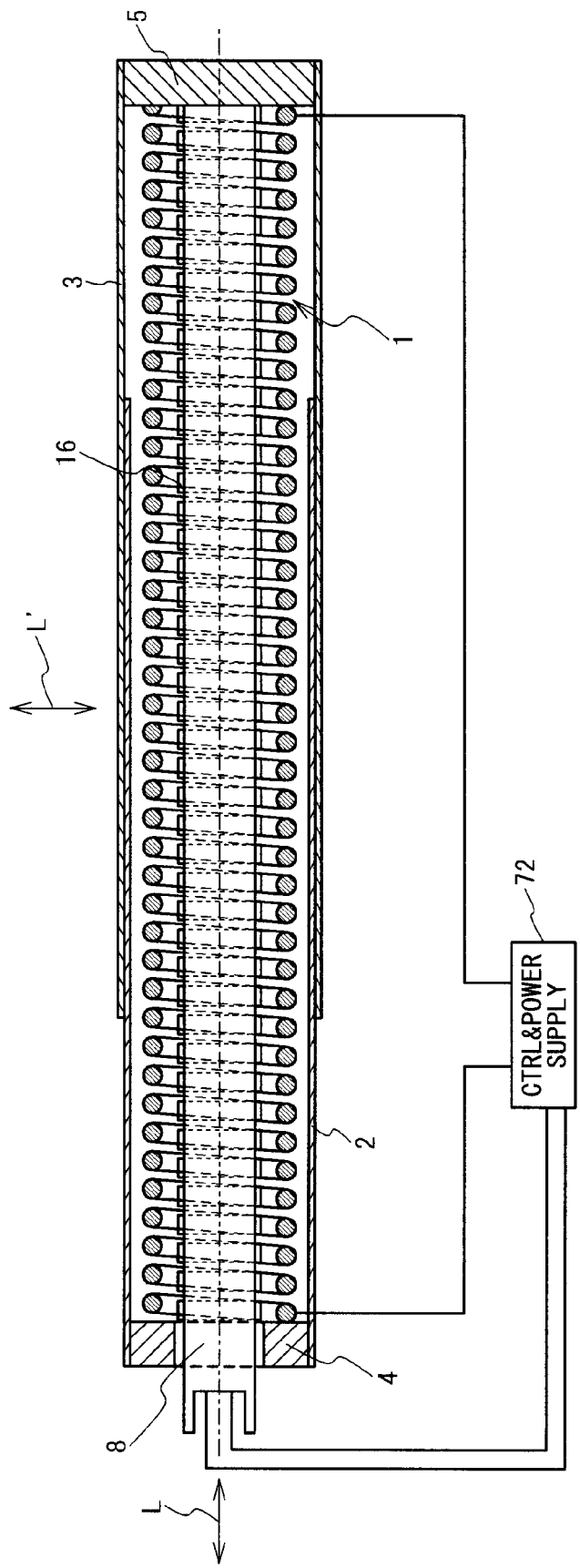
FIG. 12 is a front cross sectional view showing the structure of the linear actuator according to a modification of the third embodiment of the present invention.
Figure 13:
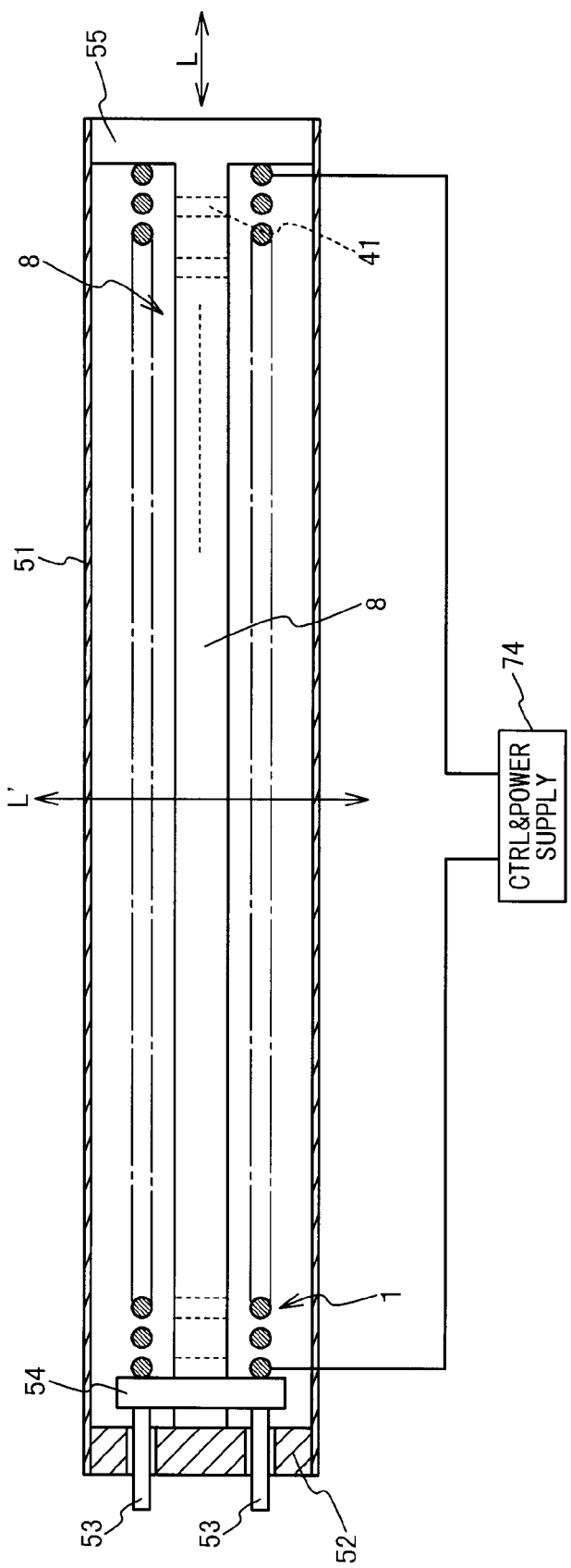
FIG. 13 is a cross sectional view showing the linear actuator according to modification of the fourth embodiment of the present invention.

FIG. 12 and FIG. 13 are modifications of the linear actuator in the third and fourth embodiments. In FIG. 12, the circular cylinder 2 is provided on the outer side of the circular cylinder 3. Also, in FIG. 13, the pins 53 are connected to a single brim 54. The structures and operations will be obvious to the person in the art from the above first and second embodiments. Therefore, the detailed description is omitted.

In the linear actuator of the present invention, a spring coil itself has the excellent reproducibility that the spring coil expands or contract to an optional length based on current control. By mixing and combining the mechanical characteristic and the electromagnetic characteristic, an excellent linear actuator is provided. Moreover, it is possible to have all of the desired characteristics.

What is claimed is:

1. A linear actuator comprising:
   a linear output unit;
   a supporting unit with a stopper, said supporting unit having a first pipe, said stopper being attached to one end of said first pipe, and a part of said linear output unit being slidably accommodated in said first pipe;
   a movable unit having elasticity connected to said stopper at one end of said movable unit and to said linear output unit at the other end thereof; and
   a magnetic flux generating unit for generating first magnetic fluxes;
   wherein said movable unit generates second magnetic fluxes in a direction orthogonal to said first magnetic fluxes, said movable unit expands or contracts based on interaction between said first magnetic fluxes and said second magnetic fluxes, and said linear output unit moves linearly in response to expansion or contraction of said movable unit.

2. The linear actuator according to claim 1, wherein said movable unit comprises a spring coil.

3. The linear actuator according to claim 1, wherein said magnetic flux generating unit generates said first magnetic fluxes in a direction orthogonal to a direction of said second magnetic fluxes.

4. The linear actuator according to claim 1, wherein at least a part of said magnetic flux generating unit is accommodated in said movable unit.

5. The linear actuator according to claim 4, wherein said magnetic flux generating unit comprises:
   a bobbin case; and
   an electromagnetic coil which is wound on said bobbin case.

6. The linear actuator according to claim 5, further comprising a control unit which supplies a first current to said magnetic flux generating unit such that said magnetic flux generating unit generates said first magnetic fluxes.

7. The linear actuator according to claim 6, wherein said movable unit comprises a spring coil, said control unit supplies a second current to said spring coil such that said spring coil generates said second magnetic fluxes, and said spring coil expands or contracts such that interaction between said first magnetic fluxes and said second magnetic fluxes balances with elasticity of said spring coil.

8. The linear actuator according to claim 7, wherein said control unit supplies constant current to said movable unit and controls said current supplied to said electromagnetic coil to control the expansion and contraction of said movable unit.

9. The linear actuator according to claim 7, wherein said control unit supplies constant current to said magnetic flux generating unit and controls said current supplied to said movable unit to control the expansion and contraction of said movable unit.

10. The linear actuator according to claim 4, wherein said magnetic flux generating unit comprises:
    a bobbin case; and
    magnets which are embedded in said bobbin case.

11. The linear actuator according to claim 9, wherein said movable unit comprises a spring coil, said linear actuator further comprises a control unit which supplies a second current to said spring coil such that said spring coil generates second magnetic fluxes, and
    said spring coil expands or contracts such that interaction between said first magnetic fluxes and said second magnetic fluxes balances with elasticity of said spring coil.

12. The linear actuator according to claim 1, wherein said linear output unit comprises:
    a second pipe slidable with said first pipe; and
    a stopper connected to said movable unit and attached to one end of said second pipe opposite said first pipe.

13. The linear actuator according to claim 1, wherein said supporting unit comprises:
    a first pipe;
    said stopper which is attached to one end of said first pipe; and
    an additional stopper which is attached to the other end of said first pipe and has a hole section; and
    wherein a part of said linear output unit is slidably accommodated in said first pipe.

14. The linear actuator according to claim 13, wherein said linear output unit comprises:
    a base section connected to said movable unit and accommodated in said first pipe; and
    said movable unit which extends from said base section through said hole section of said additional stopper.

15. The linear actuator according to claim 1, wherein said stopper of said supporting unit and said magnetic flux generating unit are made unitary.

16. A linear actuator comprising:

a magnetic flux generating section which is fixed and generates first magnetic fluxes in a first direction, said magnetic flux generating section further comprising a first pipe and a stopper, said stopper being attached to one end of said first pipe; and a movable unit which includes a spring coil, is attached to said magnetic flux generating section, accommodates at least a part of said magnetic flux generating section and generates second magnetic fluxes in a second direction orthogonal to said first direction, wherein said movable unit linearly expands or contracts such that interaction between said first magnetic fluxes and said second magnetic fluxes balances with said elasticity, and a part of said movable unit is provided to be slidable with said magnetic flux generating section.

17. The linear actuator according to claim 16, wherein said movable unit comprises a spring coil, and said magnetic flux generating section comprises:
   a bobbin case; and
   an electromagnetic coil which is wound on said bobbin case to generate said first magnetic fluxes.

18. The linear actuator according to claim 16, wherein said movable unit comprises a spring coil, and said magnetic flux generating section comprises:
   a bobbin case; and
   magnets which are embedded in said bobbin case to generate said first magnetic fluxes.

19. A linear actuator comprising:

an operation body arranged within and extending substantially along an entire length of a cylinder, said operation body expanding or contracting in response to magnetic forces;

a magnetic flux generating unit which generates magnetic fluxes in a direction orthogonal to a direction of expansion or contraction of said operation body; and a linear output unit which outputs contraction force at both ends of said operation body and moves relatively to in the direction of the expansion or contraction of said operation body;

wherein said operation body has a spring constant and expands or contracts to a length corresponding to the magnetic fluxes generated by said magnetic flux generating unit.

* * * * *